Dec. 6, 1966  G. T. REININGER ETAL  3,289,345
FISHING SPOON LURE
Filed Oct. 19, 1964

3,289,345
FISHING SPOON LURE
Gail Ted Reininger, 2707 Tidewater, Houston, Tex., and Richard Louis Reininger and Richard Louis Reininger, Jr., both of Box 214, La Salle, Tex.
Filed Oct. 19, 1964, Ser. No. 404,858
1 Claim. (Cl. 43—42.09)

This invention relates to a combination of sleeves that fit over an elliptical fishing spoon.

After a fisherman uses his fishing spoons a good number of times the spoons tend to lose their brilliance and color and usually have to be discarded. This is particularly true with the gold colored spoons. Thus an object of the invention is to provide a number of sleeves of different colors and/or designs that give new life to the old fishing spoon. The invention could also be used on new spoons to give them different color and/or design fishing lure variations. Onother object of the invention is to provide a fishing spoon sleeve of the above type that is quick and simple to attach to or detach from the spoon. Other objects will become apparent from the accompanying drawing and from the following descriptions.

Figure 1:
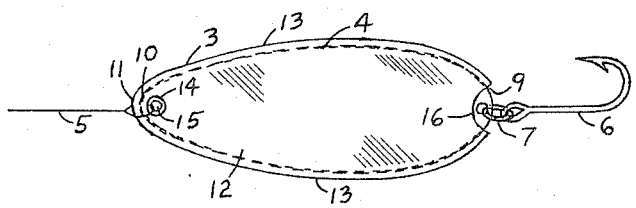
Figure 2:
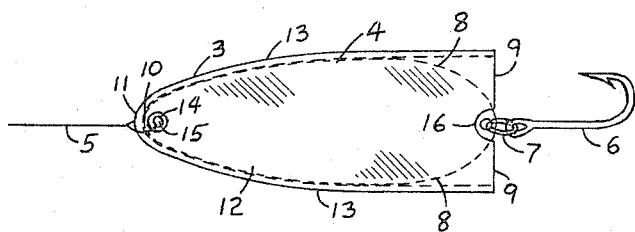

Description of the accompanying drawing is as follows: FIGURE 1 is a side view of one of the flat sides of the fishing spoon with a tightly fitting sleeve, line attached, and hook attached. FIGURE 2 is similar to FIGURE 1 except that sleeve fits less tightly near the back end of the spoon.

The invention is illustrated by the accompanying drawing FIGURES 1 and 2 which show a typical sleeve 3 fitted over a typical fishing spoon 4, a line 5 attached, and a hook 6 attached to spoon 4 by connector 7. Other sleeves would be similar but would be different in colors and/or designs, and would also be different in sizes and shapes for other spoons. The invention would be made of suitable materials. Sleeve 3 is thin walled, hollow, and resembles a flat sock. The inside or hollow part of sleeve 3 is shaped to tightly fit the contour and size of spoon 4 as shown in FIGURE 1 for stretch materials of construction. However, as shown in FIGURE 2 for rigid materials of construction sleeve 3 would be shaped to fit less tightly near the back end 8 of spoon 4 so as to allow sufficient room for ease of spoon 4 to slip inside sleeve 3. Sleeve 3 is open at its back end 9 as this is where the front end 10 of spoon 4 is initially slipped in. Sleeve 3 is closed at its front end 11, closed at each of its flat sides 12, and closed at its side edges 13 so as to retain spoon 4. Sleeve 3 has a small hole 14 in each of its flat sides 12 near the front end 11. When spoon 4 has been properly inserted inside sleeve 3, the holes 14 on sleeve 3 are even with the line attachment hole 15 of spoon 4. When line 5 is fastened thru holes 14 and hole 15 as shown in FIGURES 1 and 2, the sleeve 3 is thereby fastened to spoon 4. Sleeve 3 has a notch 16 on each of its flat sides 12 near the open back end 9. The notches 16 are to eliminate rubbing of sleeve 3 by connector 7.

To use the invention, line 5 is un-fastened from spoon 4 containing hook 6 and then the front end 10 of said spoon 4 is inserted into the back end 9 of one of the sleeves 3 and pushed inside same until hole 15 is even with holes 14. Line 5 is now fastened thru holes 14 and hole 15 which thereby fastens sleeve 3 to spoon 4 and makes the assembly ready for fishing. To provide spoon 4 with other color and/or design sleeve variations, simply un-fasten line 5 from the above assembly, pull spoon 4 out of said sleeve 3, insert spoon 4 into desired sleeve 3 as above, and fasten as above. When using the stretch materials of construction sleeve 3 on shown in FIGURE 1, the open back end 9 may first be expanded or stretched open slightly by the fingers until spoon 4 has been initially inserted into sleeve 3 and then spoon 4 can be easily pushed inside sleeve 3 to the proper position.

What is claimed as new is as follows:

A combination of sleeves of different colors and/or designs that can be individually fitted over an elliptical fishing spoon and fastened to give said spoon several different fishing lure variations, in which each said sleeve would be made of suitable materials, in which each said sleeve is thin walled, hollow, and resembles a flat sock, in which the inside or hollow part of each said sleeve is shaped to tightly fit the contour and size of said spoon at its forward end and is shaped at its rear portion to provide parallel side edges and a transverse straight back edge normal to said side edges whereby said sleeve may fit less tightly near the back end of said spoon, in which each said sleeve is open at its back end, closed at its front end, closed at each of its flat sides, and closed at its side edges, except that said sleeve has a small hole in each of its flat sides near the front end and a notch in each of its flat sides near the back end, said sleeve having a length corresponding to that of said spoon in which said spoon with line detached and hook attached may be fitted with one of the said sleeves by inserting the front end of said spoon into said back end of said sleeve and then pushing same all the way into said sleeve until a line attachment hole on said spoon is even with the said small holes on said sleeve and then the line may be fastened thru these said small holes and thru said line attachment hole which thereby fastens said sleeve to said spoon and makes the assembly ready for fishing, and in which said spoon can be fitted with other color and/or design sleeve variations by un-fastening said line from the above assembly, pulling said spoon out of said sleeve, inserting said spoon into a desired second sleeve as above, and fastening as above.

References Cited by the Examiner
UNITED STATES PATENTS

| | | | |
|---|---|---|---|
| 1,088,475 | 2/1914 | Stewart | 43—42.09 |
| 1,600,653 | 9/1926 | Steenstrup | 43—42.09 |
| 1,611,117 | 12/1926 | Kearns | 43—42.09 |
| 2,003,976 | 6/1935 | Raymond | 43—42.09 |
| 2,796,693 | 6/1957 | Gunterman | 43—42.09 |

SAMUEL KOREN, *Primary Examiner.*

D. J. LEACH, *Assistant Examiner.*